UNITED STATES PATENT OFFICE.

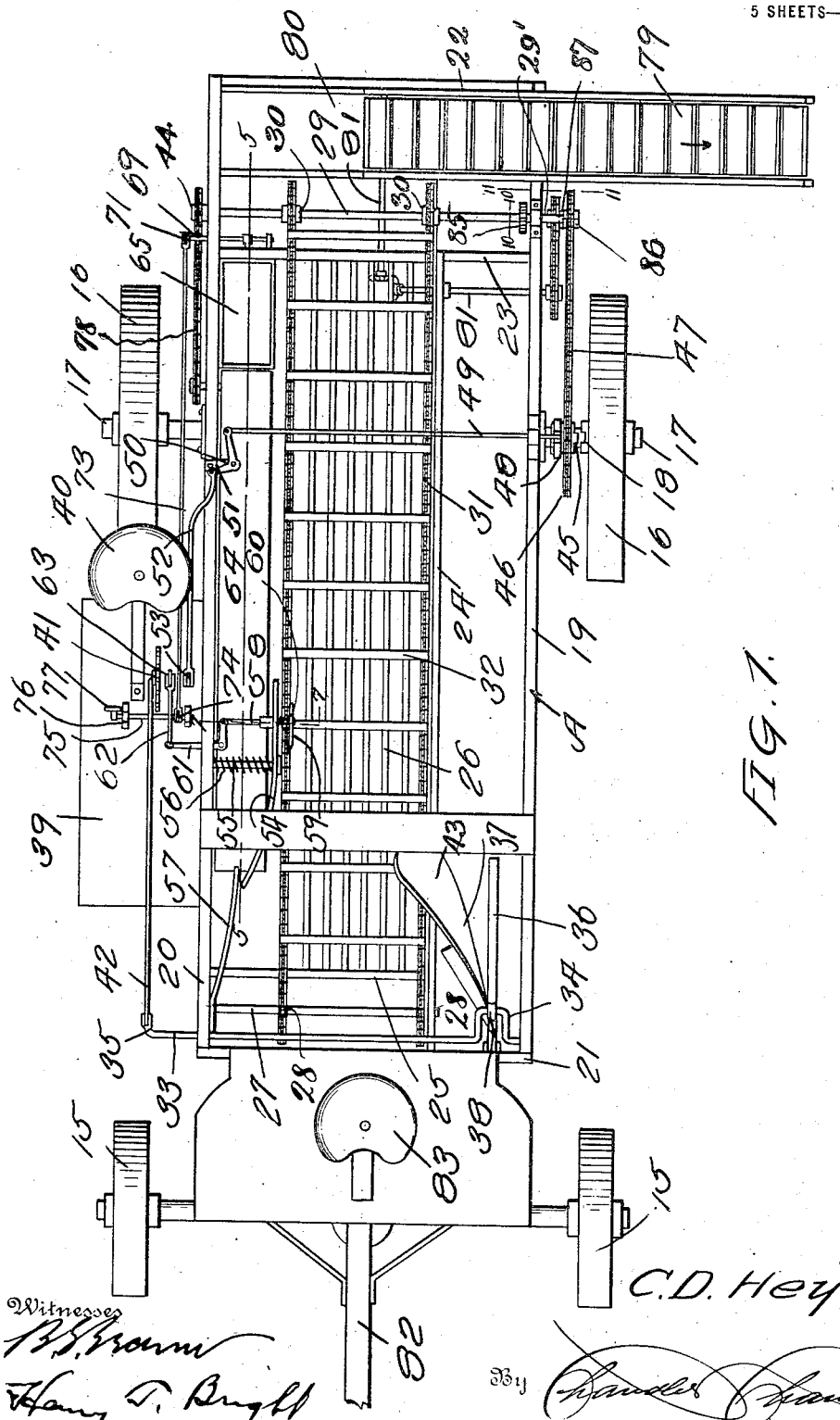

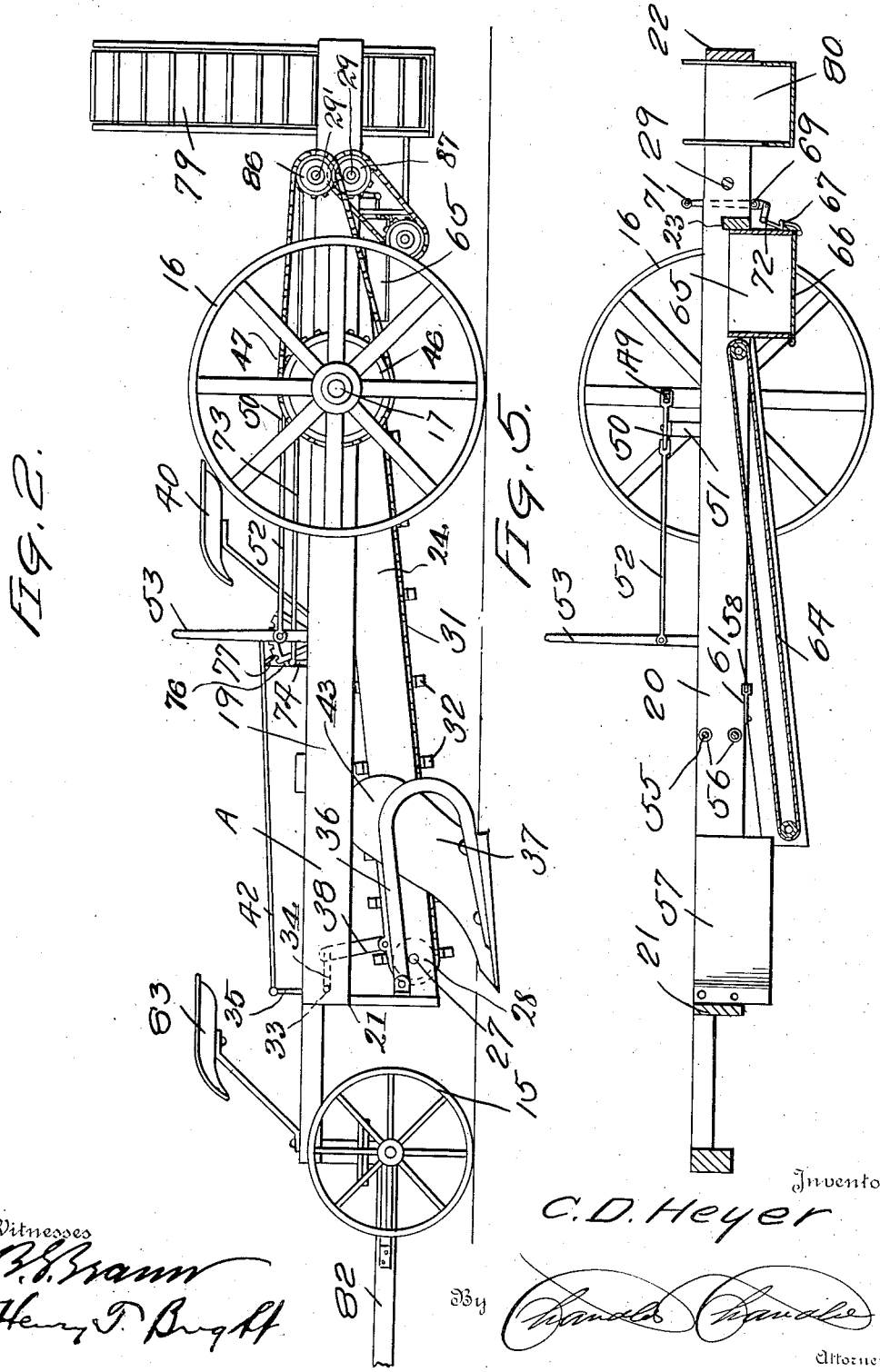

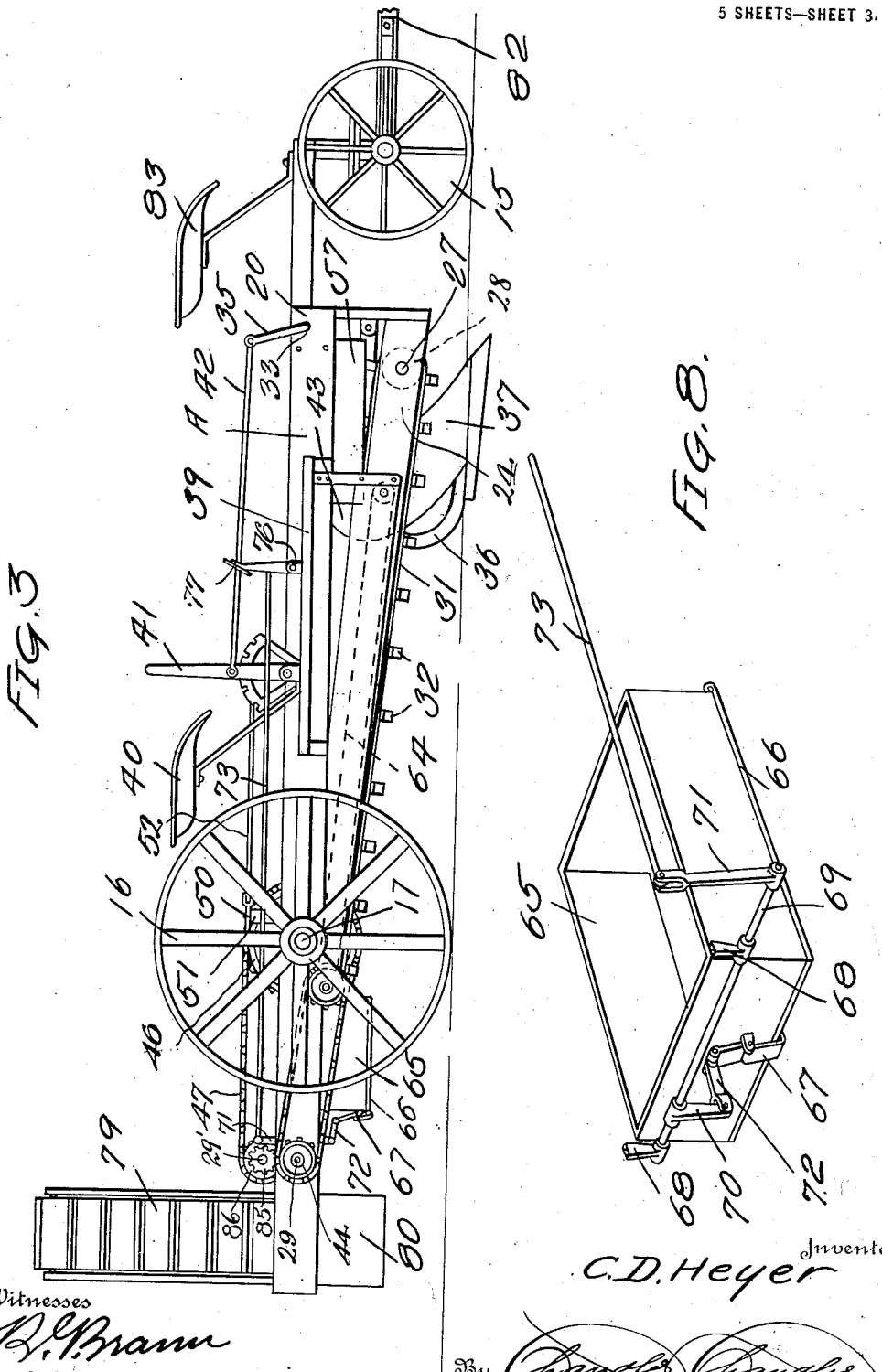

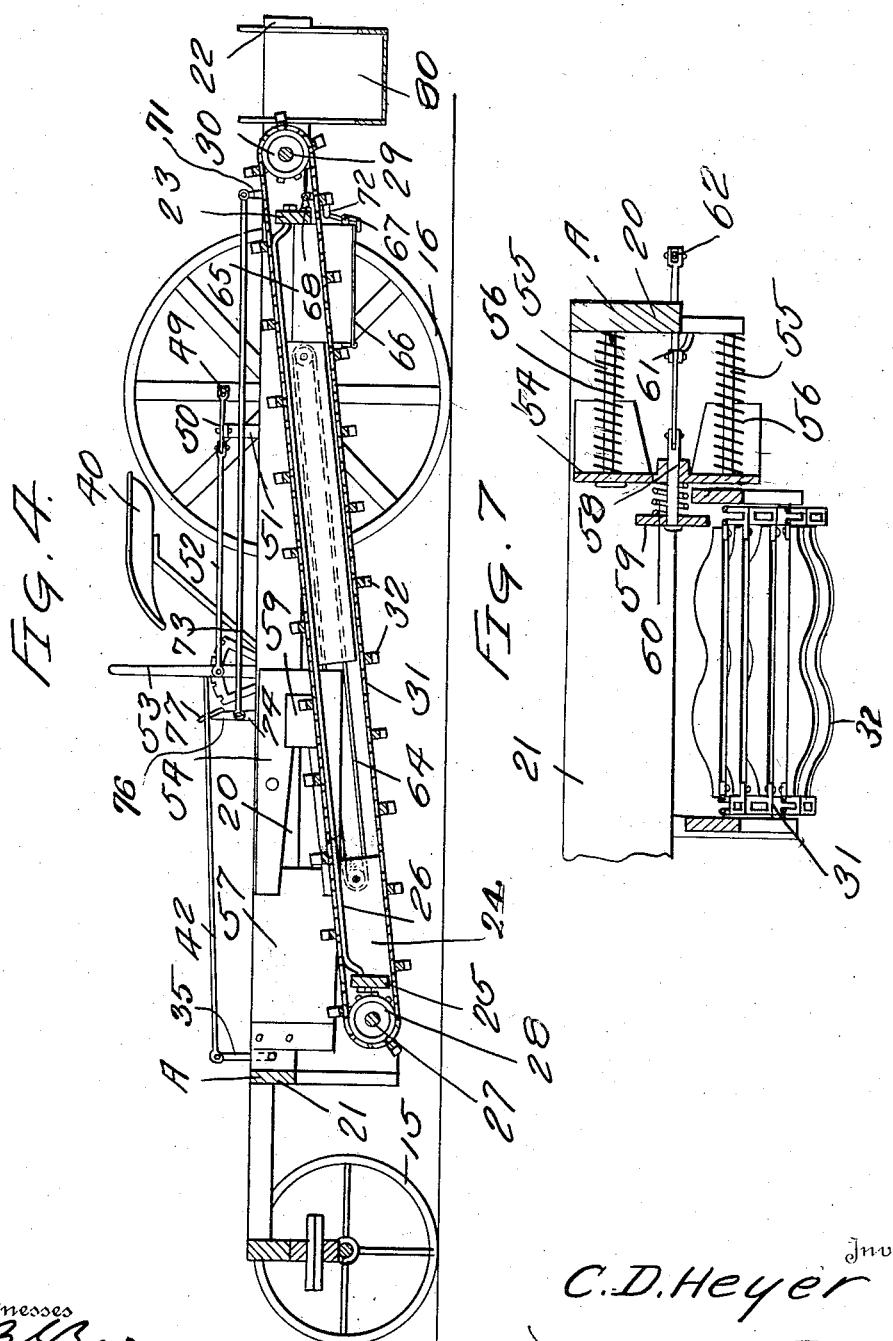

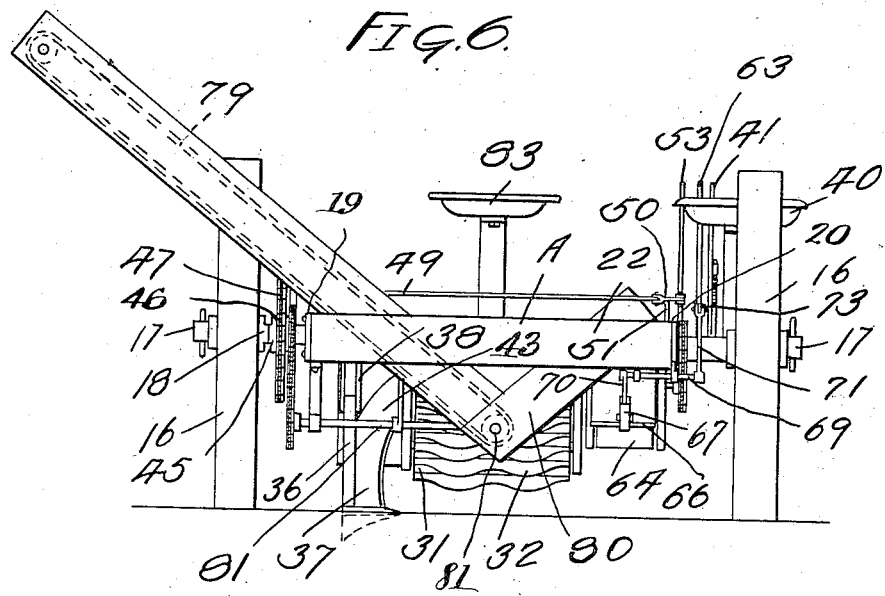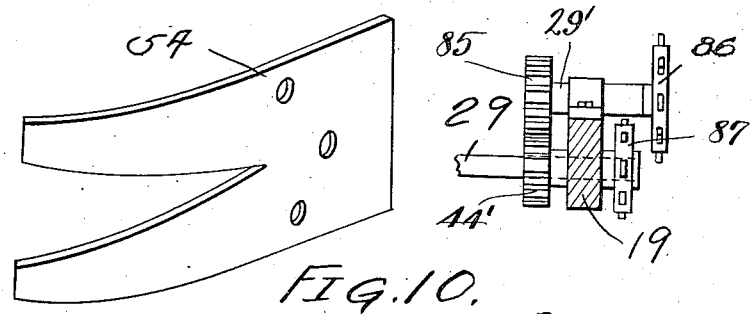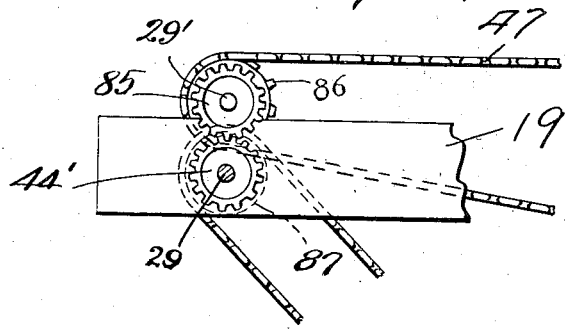

CARL DONALD HEYER, OF LAIRD, COLORADO.

BEET-HARVESTING MACHINE.

1,218,860. Specification of Letters Patent. Patented Mar. 13, 1917.

Application filed January 19, 1915. Serial No. 3,121.

*To all whom it may concern:*

Be it known that I, CARL DONALD HEYER, a citizen of the United States, residing at Laird, in the county of Yuma, State of Colorado, have invented certain new and useful Improvements in Beet-Harvesting Machines; and I do hereby declare the following to be a full, clear, and exact description of the invention, such as will enable others skilled in the art to which it appertains to make and use the same.

This invention relates to beet harvesting machines.

The object of the invention resides in the provision of a beet harvesting machine embodying an improved construction for cutting the beets after they are removed from the ground.

With the above and other objects in view the invention consists in the details of construction and in the arrangement and combination of parts to be hereinafter more fully described and particularly pointed out in the appended claims.
In describing the invention in detail reference will be had to the accompanying drawings wherein like characters of reference denote corresponding parts in the several views, and in which—
Figure 1 is a plan view of a beet harvesting machine constructed in accordance with the invention;

Fig. 2, a side view of same;

Fig. 3, a view similar to Fig. 2 looking at the opposite side of the machine;

Fig. 4, a longitudinal section of the machine;

Fig. 5, a section on the line 5—5 of Fig. 1;

Fig. 6, a rear elevation of the machine;
Fig. 7, a section on the line 7—7 of Fig. 1;

Fig. 8, a perspective view of the receptacle which receives the severed beet tops;

Fig. 9, a perspective view of the forked plate which guides the beets to the knife;
Fig. 10, a section on the line 10—10 of Fig. 1, and Fig. 11, a section on the line 11—11 of Fig. 1.

Referring to the drawings the improved beet harvester is shown as comprising a frame A supported upon front wheels 15, and rear wheels 16. The rear wheels 16 are rotatably mounted respectively upon stub axles 17 projecting laterally from each side of the frame A. Each of the wheels 17 has fixed on its inner side a clutch element 18 for a purpose that will presently appear. The frame A comprises side members 19 and 20, a front member 21, and a rear member 22. Connecting the side members 19 and 20 is a cross member 23 and this cross member is connected to the front member 21 by means of a longitudinal member 24. The longitudinal member 24 is connected to the side member 20 by means of a cross member 25. The cross members 23 and 25 are connected by a plurality of spaced rods 26 which form a support for a conveyer to be hereinafter referred to. Journaled between the longitudinal member 24 and a side portion of the frame A adjacent the forward end of the frame is a shaft 27 which has fixed thereon spaced sprocket wheels 28. Journaled between the side members 19 and 20 adjacent the rear of the frame A is a shaft 29 which has fixed thereon sprocket wheels 30 alining with respective sprocket wheels 28. Traveling on alined sprocket wheels 30 and 28 are sprocket chains 31 and connecting these sprocket chains and traversing the rods 26 are bars 32. Rotatably mounted between the side members 19 and 20 adjacent the front end of the frame A is a shaft 33 provided with a crank portion 34 disposed between the side member 19 and a side portion of the frame A and further provided with a crank arm 35 disposed adjacent the outer side of the side member 20. Pivotally connected to the front member 21 is a beam 36 which carries a plow 37. The beam 36 is connected to the crank portion 34 by means of a link 38 whereby the plow 37 can be raised and lowered by rotating the shaft 33. Secured to the side member 20 is a laterally projecting platform 39 upon which is mounted an operator's seat 40. Pivoted upon this platform 39 in advance of the seat 40 is a lever 41 which is connected to the arm 35 by means of a link 42. By this construction it will be apparent that the operator can readily adjust the plow 37 through the medium of the lever 41 to suit the conditions at hand. It will be noted that the mold board of the plow 37, which is indicated at 43 is curved so as to overlap the conveyer formed by the sprocket chains 31 and bars 32. As a result of this construction it will be obvious that the beets will be deposited, as removed from the ground, upon the rods 26 in the path of the bars 32 and with their tops directed toward the side member 20. The shaft 29 has fixed on its end without the frame A a sprocket wheel 44, and at the other end without the frame A a sprocket wheel 87; also fixed upon said shaft adjacent the side 19 of the frame A is a gear wheel 44'. Supported directly above the shaft 29 by the side member 19 is a stub shaft 29' having fixed at one end the gear wheel 85 meshing with the gear wheel 44' carried by the shaft 29. The other end of the shaft 29' has secured thereto the sprocket wheel 86. Slidably and non-rotatably mounted on the stud axle 17 carried by the side member 19 is a clutch sleeve 45 which has fixed thereon a sprocket wheel 46 and traveling on the latter and the adjacent sprocket wheel 86 is a sprocket chain 47. Rotatably mounted upon the sleeve 45 is a yoke 48 to which is connected one end of a rod 49. The other end of the rod 49 is connected to one arm of an angle lever 50 which is pivotally mounted upon a bracket 51 carried by the side member 20. The other arm of the angle lever 50 has connected thereto one end of a rod 52 which latter is in turn connected to a hand lever 53 mounted upon the platform 39. By this construction it will be obvious that the manipulation of the lever 53 will serve to connect and disconnect the clutch sleeve to and from the clutch element 18 and in this way the operation of the machine is controlled.

The mechanism for cutting the tops from the beets is shown as comprising a forked plate 54 which is slidably mounted upon studs 55 carried by the side member 20 and projecting inwardly therefrom. The plate 54 is normally held at the limit of its movement away from the side member 20 by means of springs 56 encircling respective studs 55 and bearing at one end against the side member 20 and at their other ends against the plate 54. A guide plate 57 is secured to the side member 20 and has its rear end overlapped by the forward end of the forked plate 54. Slidably mounted in the plate 54 is a rod 58 which carries on the end thereof remote from the side member 20 a knife 59. This knife is normally held at the limits of its movement away from the plate 54 by means of a spring 60 one end of which bears against the plate 54 and the other end against the knife 59. The end of the rod 58 remote from the knife 59 is connected to one arm of an angle lever 61 and the other arm of the latter is connected by a link 62 to a lever 63 mounted upon the platform 39, it being noted that the angle lever 61 is pivotally mounted upon the side member 20. By this construction it will be obvious that the knife 59 can be adjusted toward and away from the plate 54 through the medium of the lever 63. Mounted within the frame A between the side member 20 and the conveyer formed by the chains 31 and bars 32 is a conveyer 64 the forward end of which extends beneath the plate 54 while the rear end thereof discharges into a receptacle 65 supported by the frame A and including a hinged bottom 66 adapted to be secured in closed position by means of a pivoted latch 67. Rotatably mounted in bearings 68 depending from the frame A is a shaft 69 having arms 70 and 71. The arm 70 is connected to an arm 72 on the latch 67 so that by rotating the shaft 69 the latch 67 may be moved to release position and permit the bottom 66 of the receptacle to drop and discharge the contents of the receptacle. Connected to the arm 71 is one end of a rod which has its other end connected to an arm 74 fixed on a shaft 75 rotatably mounted upon the platform 39. This shaft 75 also has fixed thereon an arm 76 carrying a pedal 77 whereby the shaft 75 may be rotated by the operator by means of his foot to effect release of the latch 67. The conveyer 64 is operated by the rotation of the shaft 29 through the medium of connections 78.

The conveyer formed by the chains 31 and bars 32 is directly operated by the rotation of the shaft 29 and discharges to a transverse conveyer 79 and an inclined feed 80 mounted upon the frame A. The conveyer 79 is operated by the rotation of the shaft 29 through the medium of suitable connections 81.

The machine is provided with the necessary draft tongue 82 and driver's seat 83.

In the operation of the machine it will be obvious that the plow 37 will remove the beets from the ground and deposit same upon the rods 26 along which latter they will be moved by the bars 32. During this movement of the beets they will pass between the arms of the plate 54 and into engagement with the knife 59. The latter can be adjusted by the operator to engage the beets at the desired point and as the beets are pressed against the knife by the bars 32 the tops will be severed and fall upon the conveyer 64. The separated tops will then be discharged into the receptacle 65 from which they may be emptied by the operator at desired intervals. The beets will be moved along the rods 26 by the bars 32 and eventually discharge to the conveyer 79 from which latter they will be delivered to a suitable wagon adjacent the machine. During the travel of the beets along the rods 26 the earth will be separated therefrom and fall to the ground as will be obvious.

What is claimed is:—

1. In a beet harvester, the combination of a wheeled frame, a traction operated conveyer carried by the frame, digging mechanism for delivering the beets to the conveyer, a cutting mechanism mounted on the frame, and means for adjusting the cutting mechanism transversely of the conveyer.

2. In a beet harvester, the combination of a wheeled frame, a digging mechanism, a traction operated conveyer for receiving the beets from the digging mechanism, a guide plate yieldingly supported adjacent the conveyer and provided with a longitudinal recess in its forward end for receiving the tops of the beets as moved by the conveyer, and a knife element adjacent the plate and partly overlying said recess for severing the tops in their movement.

3. In a beet harvester, the combination of a wheeled frame, a digging mechanism, a traction operated conveyer for receiving the beets from the digging mechanism, studs projecting inwardly from one side of the frame, a plate slidably supported on said studs, springs encircling said studs to yieldingly hold the plate at the limit of its movement in one direction, said plate being provided with a longitudinal recess in its forward end for receiving the tops of the beets as moved by the conveyer, and a knife element adjacent the plate and partly overlying said recess for severing the tops in their movement.

In testimony whereof, I affix my signature, in the presence of two witnesses.

CARL DONALD HEYER.

Witnesses:
　EDWIN L. PALMER,
　VERN FURROW.